July 10, 1928.　　　M. H. ROBERTS　　　1,676,575
RAILWAY BOOSTER
Filed Sept. 5, 1925　　3 Sheets-Sheet 1

Inventor
Montague H. Roberts
By his Attorneys
Synnestvedt & Lechner

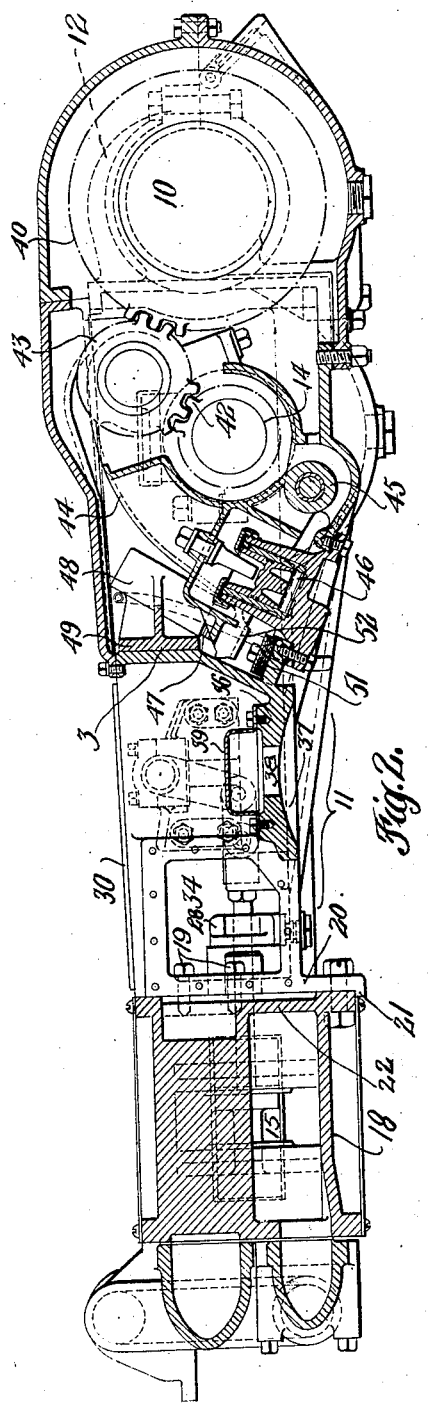
July 10, 1928.　　M. H. ROBERTS　　1,676,575
RAILWAY BOOSTER
Filed Sept. 5, 1925　　3 Sheets-Sheet 2
Inventor
Montague H. Roberts
By his Attorneys July 10, 1928.

M. H. ROBERTS 1,676,575

RAILWAY BOOSTER

Filed Sept. 5, 1925

Patented July 10, 1928.

1,676,575

UNITED STATES PATENT OFFICE.

MONTAGUE H. ROBERTS, OF ENGLEWOOD, NEW JERSEY, ASSIGNOR TO FRANKLIN RAILWAY SUPPLY COMPANY, A CORPORATION OF DELAWARE.

RAILWAY BOOSTER.

Application filed September 5, 1925. Serial No. 54,600.

My invention relates to railway boosters, and is especially concerned with structural features, such as the casing and framing and the mounting of the cylinders. I aim to make the construction as strong and rigid as possible; to eliminate or minimize vibration and the tendency of the parts to "work" or to loosen from one another in service; and also, preferably, to obviate or minimize interference of the booster with other parts of the railway vehicle equipment, and especially with removal of draw bar pins. How these and other advantages can be realized through the invention will appear from my description hereinafter of a selected and preferred embodiment.

In the drawings, Fig. 1 is a plan view of a booster embodying my invention, a portion of its casing being removed to show the parts within, and certain parts being shown in horizontal section.

Fig. 2 shows a vertical longitudinal section through the middle portion of the booster.

Fig. 3 is a similar view of the booster frame or bed plate, with various associated parts removed.

In general design and operation, as well as in various features and details of construction, the booster here shown resembles those illustrated in United States Patents Nos. 1,600,427 and 1,602,124, issued, respectively, on September 21, 1926 and October 5, 1926. It comprises (see Figs. 1 and 2) a couple of horizontal reciprocating steam engines disconnectably driving the axle 10 of a railway vehicle, such as a locomotive, a tender, or a car. At one end, the booster is mounted about and supported by the axle 10 which it drives. At or near the other end, it may be supported from a suitable part, such as the vehicle frame or the frame of a trailer or other truck to which the axle 10 belongs, in any suitable manner (not shown).

Figure 1:
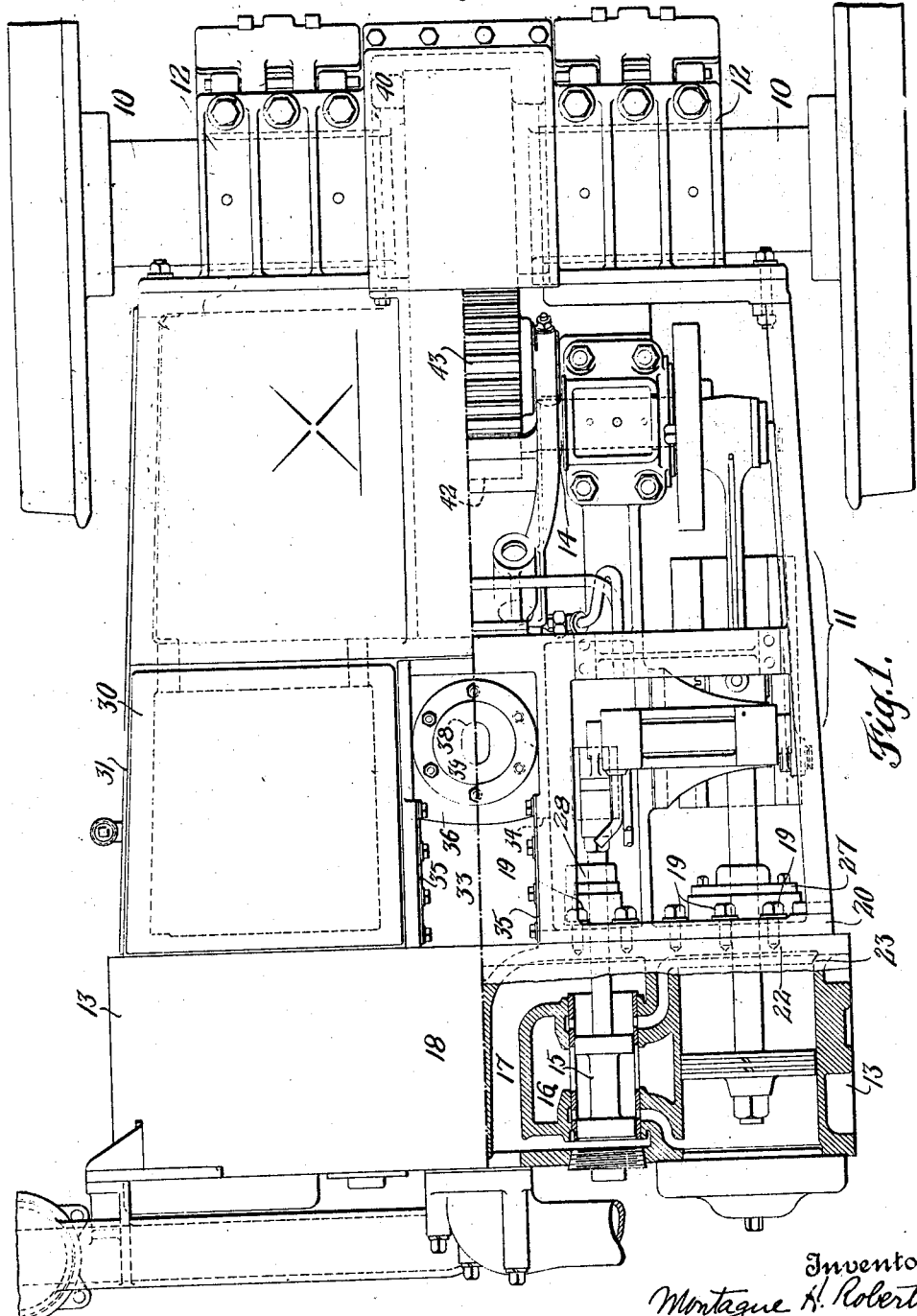
Figure 4:
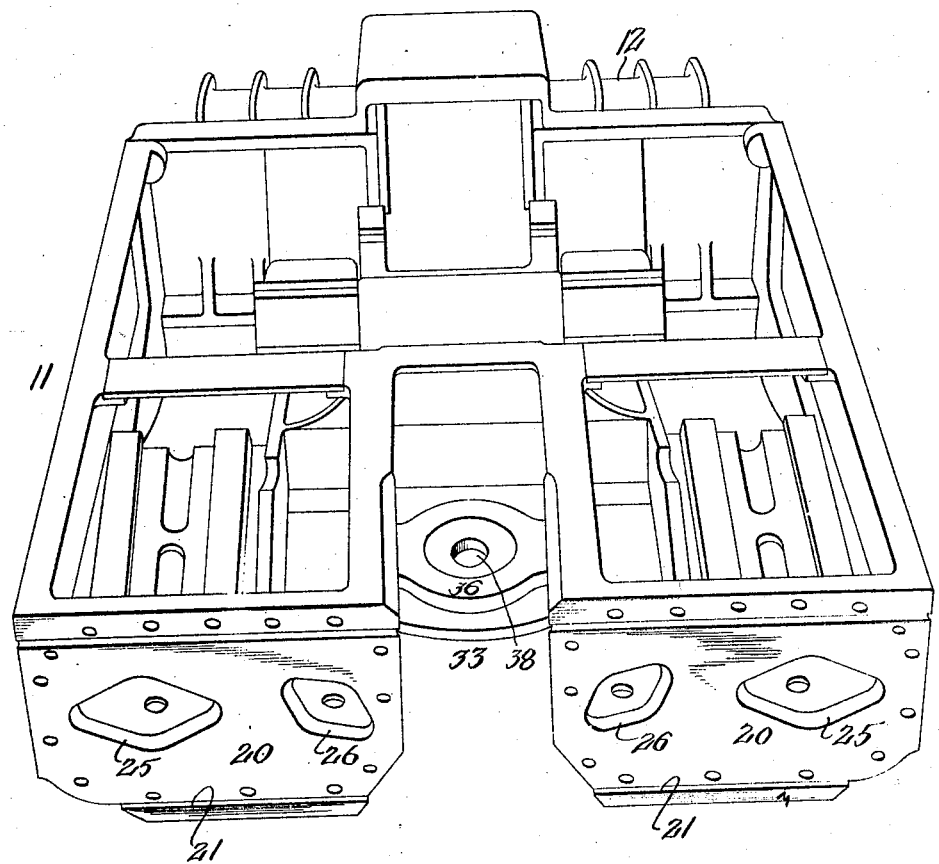
Fig. 4 is a perspective tilted view of the booster frame and casing structure from the cylinder end, with the cylinders and the top plates of the casing removed.

As shown in Figs. 1 and 2, the booster comprises a main frame and casing structure 11, which is provided at one end with bearings 12 for the axle 10 driven by the booster, and is attached to the booster cylinders 13, 13 at the other end. The structure 11 may conveniently consist of a bed plate casting such as shown in Figs. 3 and 4 as its main strength member, and suitable cover plates, bearing parts, etc., secured thereto. The booster engines are arranged one at either side of the structure 11, with their common transverse crank shaft 14 adjacent and paralleling the axle 10. As here shown, the cylinders 13, 13 and their associated valve chests 15 and steam and exhaust passages 16, 17 are in a transverse structure 18 detachably secured to the corresponding end of the frame and casing structure 11. Except as hereinafter described, the construction and operation of the engines and the booster mechanism correspond substantially to structures already in use and described in the above mentioned patents, so that no general description thereof is necessary.

Instead of having only the middle portion of its cylinder structure 18 (containing the valve chests 15 and the steam and exhaust passages 16, 17) attached to the frame and casing structure 11, as heretofore, the booster here shown has its cylinders 13, 13 themselves attached to the frame 11, substantially in line with the stresses due to the piston thrusts. As shown in Figs. 1, 2, and 3, the cylinders 13, 13 abut directly against the end of the frame 11 and are secured by bolts 19. To relieve the bolts 19 of the shearing and bending stresses due to the weight of the structure 18, the end portion 20 of the structure 11 is provided with a ledge 21 at the bottom, on which the structure 18 rests.

The attachment of the cylinders 13, 13 directly to the bed plate (Fig. 3) which forms the main structure of the booster frame and casing 11, as above described, minimizes or obviates any tendency for the piston thrust to rock the structures 11 and 18 relative to one another, which is bound to exist where these structures are secured together only by their intermediate or central portions, as heretofore.

As best shown in Fig. 1, the cylinders 13, 13 have their ends that abut against the crank case end 20 closed, being preferably cast with integral end walls 22. To facilitate the machining and finishing of the cylinder bores, they have an under-cut groove 23 at the closed end. As shown in Fig. 4, the end 20 of the frame and casing structure 11 is also closed, and is provided with openings 25 and 26 through which the piston rod and valve rod stuffing boxes 27, 28, project, so as to be accessible from the interior of the casing 11 on removal of its top or side plates 30, 31.

In the present instance, the casing 11 does not enclose the entire space between the axle 10 and the cylinder structure 18, but, on the contrary, has a central well or opening 33 therethrough adjacent such structure 18, as best shown in Figs. 1 and 4. As shown in Figs. 1, 2 and 3, the sides of this well 33 have openings 34 with removable cover plates 35. In the present instance, there is a web 36 across the bottom of the well 33, with a spherical seat 37 and a slot 38 for the vehicle or truck frame support of the booster (not shown). Access of dirt from above to the opening 38 may be prevented by a dished sheet metal cover or "hat" 39 secured to the web 36 over the opening. The well 33 permits withdrawal or replacement of the draw bar pin (not shown) therethrough, especially in the case of a locomotive,—without necessity for removal of the booster or other attachments from the vehicle for this purpose.

As shown in Figs. 1 and 2, the axle 10 is driven from the booster crank shaft 14 through gears 40, 42 on said axle and shaft, respectively, and a co-acting idler gear 43 on a rocker 44 pivoted to the bed plate of the frame structure 11 at 45. By swinging the rocker 44 to and fro, the pinion 43 is swung into or out of mesh with the axle gear 40, while remaining all the time in mesh with the crank shaft gear 42, and the booster thus entrained to assist the locomotive, or disentrained. As shown in Fig. 1, the mechanism for this purpose comprises a pressure cylinder 46 that is removably mounted in an opening in the bottom of the bed plate, being constructed, arranged, and operating substantially as described in my Patent No. 1,602,120, issued on October 5, 1926. In the present instance, however, the spring 47 that tends to throw the pinion 43 out of mesh with the gear 40 when the pressure is vented from the cylinder 46 is mounted and housed in a cylindrical casing 48 carried by a bracket 49 detachably secured to the transverse wall at the crank end of the well 33 in the bed plate structure. An elastic buffer 51 is mounted on the bed plate to take the impact of a lug 52 on the rocker 44 when the spring 47 throws the gear 43 out of mesh with the gear 40 to disentrain the booster.

I claim:—

1. A railway booster mechanism comprising a bed plate provided at the rear end thereof with a pair of transversely aligned walls, a multiple cylinder structure provided with an integrally formed end wall for each cylinder, and means for securing said cylinder end walls directly to said transversely aligned walls of the bed plate.

2. A railway booster mechanism comprising a bed plate provided at the forward end thereof with a pair of inverted axle bearings and at the rear end thereof with a pair of transversely aligned wall sections, each of said bearings being in substantial longitudinal alignment with one of said wall sections, and a multiple cylinder structure provided with an integrally formed end wall for each cylinder, said cylinder structure being directly secured through said end walls to said rear wall sections of the bed plate.

3. A railway booster mechanism comprising a substantially horizontally disposed bed plate, a pair of transversely spaced wall sections at the rear end of said bed plate and a pair of cylinders detachably secured to the bed plate with their inner ends fitted against said spaced wall sections.

4. A railway booster comprising a crank case and frame structure with apertured end wall, and cylinders with closed ends secured against said end wall, with their stuffing boxes accessible from the interior of the casing through said openings.

5. A railway booster mechanism comprising a substantially horizontally disposed bed plate, a pair of booster engines arranged at either side of said bed plate, and an integrally formed multiple cylinder structure arranged transversely across the rear end of said bed plate, each of the cylinders being substantially in line with its respective engine so as to minimize any tendency for piston thrusts to rock said cylinder structure with respect to the bed plate.

6. A railway booster mechanism comprising a substantially horizontally disposed bed plate of generally U-shape and an integrally formed multiple cylinder structure extending transversely across and secured to the ends of the U.

7. A railway booster comprising a U-shaped crank case and frame structure with apertured end walls for the U legs, and cylinders with closed ends secured against the ends of the U legs, their stuffing boxes being accessible from the interior of the casing through said openings.

8. A railway booster mechanism comprising a bed plate, the rear portion of which is provided with a pair of transversely spaced rearwardly extending compartments, a wall at the rear end of each of said compartments, and a multiple cylinder structure extending transversely across the entire width of the rear end of said bed plate and attached to said walls.

9. Locomotive booster mechanism comprising in combination a substantially horizontally disposed bed plate, a pair of transversely extending spaced upstanding wall sections at an end thereof, and a booster cylinder on each of said sections projecting outwardly therefrom.

10. Locomotive booster mechanism comprising in combination a substantially horizontally disposed bed plate, an engine receiving pocket in each side of said bed plate, a crank shaft bearing near the forward end of each pocket, a transversely extending upstanding wall section at the rear end of each pocket, and a booster cylinder on each of said wall sections extending rearwardly therefrom.

11. Locomotive booster mechanism comprising in combination a substantially horizontally disposed bed plate, axle engaging means at one end, a pair of transversely extending spaced upstanding wall sections at the other end, and a booster cylinder on each of said wall sections projecting outwardly therefrom away from the axle engaging means.

12. Locomotive booster mechanism comprising in combination a substantially horizontally disposed U-shaped bed plate, a transversely extending upstanding wall section across each leg of the U, a crank pocket in front of each of said wall sections, and a booster cylinder on each section projecting rearwardly therefrom.

13. A railway booster comprising a U-shaped crank case and frame structure with apertured end walls for the U legs, and cylinders on the end walls of the U legs, their stuffing boxes being accessible from the interior of the casing through said openings.

14. A railway booster comprising a crank case and frame structure with apertured end wall, and cylinders on said end wall with their stuffing boxes accessible from the interior of the casing through said openings.

In testimony whereof, I have hereunto signed my name.

MONTAGUE H. ROBERTS.